US011361515B2

(12) United States Patent
Bilgory et al.

(10) Patent No.: US 11,361,515 B2
(45) Date of Patent: Jun. 14, 2022

(54) AUTOMATED GENERATION OF SELF-GUIDED AUGMENTED REALITY SESSION PLANS FROM REMOTELY-GUIDED AUGMENTED REALITY SESSIONS

(71) Applicant: International Business Machines Corporation, Armonk, NY (US)

(72) Inventors: Erez Lev Meir Bilgory, Kiryat Tivon (IL); Adi Raz Goldfarb, Akko (IL)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 17/073,354

(22) Filed: Oct. 18, 2020

(65) Prior Publication Data
US 2022/0122327 A1   Apr. 21, 2022

(51) Int. Cl.
| | | |
|---|---|---|
| *G06T 19/00* | (2011.01) | |
| *H04L 51/046* | (2022.01) | |
| *G06T 19/20* | (2011.01) | |
| *H04W 4/029* | (2018.01) | |
| *G06F 40/35* | (2020.01) | |

(52) U.S. Cl.
CPC ............ *G06T 19/006* (2013.01); *G06F 40/35* (2020.01); *G06T 19/20* (2013.01); *H04L 51/046* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 7,529,465 B2* | 5/2009 | Barton | ............... | G11B 27/3054 386/234 |
| 7,937,734 B2* | 5/2011 | Haddad | .............. | H04N 7/17318 725/87 |

(Continued)

OTHER PUBLICATIONS

Bhaskar Bhattacharya, "Automatic generation of augmented reality guided assembly instructions using expert demonstration", 2016 Graduate Theses and Dissertations, 15877 (Year: 2016).*

(Continued)

*Primary Examiner* — David H Chu
(74) *Attorney, Agent, or Firm* — Dvir Gassner

(57) ABSTRACT

Generating a self-guided augmented reality (AR) session plan from a remotely-guided AR session held between a remote user and a local user, by: Receiving data recorded during the remotely-guided AR session. Segmenting the data into temporal segments that correspond to steps performed by the local user during the remotely-guided AR session. The steps are detected using at least one of: a Natural-Language Understanding (NLU) algorithm applied to a conversation included in the data, to detect utterances indicative of step-to-step transitions; location analysis of annotations included in the data, to detect location differences indicative of step-to-step transitions; and analysis of camera pose data included in the data, to detect pose transitions indicative of step-to-step transitions. Generating the self-guided AR session plan based on the segmented data and a 3D representation of the scene, the AR session plan including step-by-step AR guidance on how to perform the various steps.

20 Claims, 5 Drawing Sheets

(56) References Cited

U.S. PATENT DOCUMENTS

| | | | | |
|---|---|---|---|---|
| 8,204,317 | B2* | 6/2012 | Barbieri | G06V 20/47 382/224 |
| 10,602,117 | B1* | 3/2020 | Côté | G09B 19/24 |
| 10,628,518 | B1* | 4/2020 | Francois | G11B 27/327 |
| 2008/0260115 | A1* | 10/2008 | Sinha | H04L 65/605 379/88.17 |
| 2008/0310709 | A1* | 12/2008 | Kender | G06V 20/40 382/160 |
| 2010/0316359 | A1* | 12/2010 | Maliy | H04N 5/85 386/343 |
| 2011/0211812 | A1* | 9/2011 | Tzoukermann | H04N 21/84 386/250 |
| 2013/0132605 | A1* | 5/2013 | Kocks | H04L 65/80 709/236 |
| 2018/0324229 | A1* | 11/2018 | Ross | H04L 65/4015 |
| 2019/0005833 | A1* | 1/2019 | Das | G09B 19/003 |
| 2019/0014884 | A1* | 1/2019 | Fu | G06V 20/20 |
| 2019/0304188 | A1* | 10/2019 | Bridgeman | G09B 19/003 |
| 2019/0340200 | A1 | 11/2019 | Coimbra | |
| 2020/0026257 | A1* | 1/2020 | Dalal | G06V 20/41 |
| 2020/0043355 | A1 | 2/2020 | Kwatra | |
| 2020/0079346 | A1* | 3/2020 | Payne | B60W 20/12 |
| 2021/0064648 | A1* | 3/2021 | Farri | H04N 21/4828 |
| 2021/0142188 | A1* | 5/2021 | Howard | G09B 5/06 |
| 2021/0264810 | A1* | 8/2021 | Johnson | G09B 19/24 |
| 2021/0365742 | A1* | 11/2021 | Wang | G06V 10/82 |
| 2021/0406047 | A1* | 12/2021 | Namburu | G06F 16/957 |

OTHER PUBLICATIONS

U.S. Appl. No. 16/681,888, Ored Dubovsky.
U.S. Appl. No. 17/020,856, Adi Raz Goldfarb.
Bhaskar Bhattacharya, "Automatic generation of augmented reality guided assembly instructions using expert demonstration," Iowa State University Graduate Theses and Dissertations, 15877 (2016).
Bibeg Hang Limbua et al., "Using sensors and augmented reality to train apprentices using recorded expert performance: A systematic literature review," Educational Research Review 25 (2018) 1-22.
Matt Whitlock et al., "AuthAR: Concurrent Authoring of Tutorials for AR Assembly Guidance," Proceedings of Graphics Interface 2020: University of Toronto (2020), 431-439.

\* cited by examiner

AUTOMATED GENERATION OF SELF-GUIDED AUGMENTED REALITY SESSION PLANS FROM REMOTELY-GUIDED AUGMENTED REALITY SESSIONS

BACKGROUND

The invention relates to the field of augmented reality (AR).

AR-based remote guidance (or "assistance") is a relatively new use of AR technology. A remotely-located expert user assists and guides a local user in handling physical equipment in the local user's vicinity, by overlaying digital content on a real time video captured by the local user's camera. As the local user views this video of his or her physical surroundings on a video display, the video is simultaneously transmitted to the remote user who, using computer software, can add textual and graphical annotations at various locations on the video, which are immediately transmitted back to the local user and overlaid on the video he or she is viewing. Additional guidance may be concurrently provided by the remote user using text, audio, and/or video communications between the two users.

To spare the need for a remote expert user to provide guidance every time a local user has to handle certain equipment, self-guided AR sessions have been proposed and implemented. These sessions can be conducted by the local user alone, who is guided by pre-recorded instructions.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method that comprises operating at least one hardware processor to: Receive data recorded during a remotely-guided augmented reality (AR) session held between a remote user and a local user, the recorded data comprising: images of a scene, captured by a camera of the local user; pose data of the camera; annotations made by at least one of the remote and local users; and a conversation between the remote and local users. Automatically generate a three-dimensional (3D) representation of the scene based on the images and the camera pose data, and automatically associate the annotations with locations in the 3D representation. Automatically segment at least some of the data into multiple temporal segments that correspond to multiple steps performed by the local user in the scene during the remotely-guided AR session, wherein the multiple steps are automatically detected using at least one of: (a) applying a Natural-Language Understanding (NLU) algorithm to the conversation, to detect utterances that are indicative of step-to-step transitions, (b) analyzing the locations associated with the annotations, to detect location differences that are indicative of step-to-step transitions, and (c) analyzing the camera pose data, to detect pose transitions that are indicative of step-to-step transitions. Automatically generate a self-guided AR session plan based on the segmented data and the 3D representation, wherein the AR session plan comprises step-by-step AR guidance on how to perform the multiple steps in the scene or in a similar scene.

Another embodiment is directed to a system that comprises: at least one hardware processor; and a non-transitory computer-readable storage medium having program code embodied therewith, the program code executable by said at least one hardware processor to: Receive data recorded during a remotely-guided augmented reality (AR) session held between a remote user and a local user, the recorded data comprising: images of a scene, captured by a camera of the local user; pose data of the camera; annotations made by at least one of the remote and local users; and a conversation between the remote and local users. Automatically generate a three-dimensional (3D) representation of the scene based on the images and the camera pose data, and automatically associate the annotations with locations in the 3D representation. Automatically segment at least some of the data into multiple temporal segments that correspond to multiple steps performed by the local user in the scene during the remotely-guided AR session, wherein the multiple steps are automatically detected using at least one of: (a) applying a Natural-Language Understanding (NLU) algorithm to the conversation, to detect utterances that are indicative of step-to-step transitions, (b) analyzing the locations associated with the annotations, to detect location differences that are indicative of step-to-step transitions, and (c) analyzing the camera pose data, to detect pose transitions that are indicative of step-to-step transitions. Automatically generate a self-guided AR session plan based on the segmented data and the 3D representation, wherein the AR session plan comprises step-by-step AR guidance on how to perform the multiple steps in the scene or in a similar scene.

A further embodiment is directed to a computer program product comprising a non-transitory computer-readable storage medium having program code embodied therewith, the program code executable by at least one hardware processor to: Receive data recorded during a remotely-guided augmented reality (AR) session held between a remote user and a local user, the recorded data comprising: images of a scene, captured by a camera of the local user; pose data of the camera; annotations made by at least one of the remote and local users; and a conversation between the remote and local users. Automatically generate a three-dimensional (3D) representation of the scene based on the images and the camera pose data, and automatically associate the annotations with locations in the 3D representation. Automatically segment at least some of the data into multiple temporal segments that correspond to multiple steps performed by the local user in the scene during the remotely-guided AR session, wherein the multiple steps are automatically detected using at least one of: (a) applying a Natural-Language Understanding (NLU) algorithm to the conversation, to detect utterances that are indicative of step-to-step transitions, (b) analyzing the locations associated with the annotations, to detect location differences that are indicative of step-to-step transitions, and (c) analyzing the camera pose data, to detect pose transitions that are indicative of step-to-step transitions. Automatically generate a self-guided AR session plan based on the segmented data and the 3D representation, wherein the AR session plan comprises step-by-step AR guidance on how to perform the multiple steps in the scene or in a similar scene.

In some embodiments: the self-guided AR session plan is configured to be executed by a computerized AR system; and the self-guided AR session plan comprises program instructions configured to cause the computerized AR system to transition between steps of the step-by-step AR guidance responsive to at least one of: a user command, and machine vision detection of step completion.

In some embodiments, the step-by-step AR guidance comprises at least some of the annotations, localized according to their associated locations in the 3D representation.

In some embodiments, the step-by-step AR guidance comprises at least some of the conversation, provided as at least one of: audio, and text.

In some embodiments: the multiple steps performed by the local user in the scene comprise manipulation of at least one physical object; the generation of the 3D representation of the scene comprises generation of at least one 3D model of the at least one physical object, respectively; and the step-by-step AR guidance comprises guidance on how to manipulate the at least one physical object in the scene, or at least one similar physical object in the similar scene, respectively.

In some embodiments: the method further comprises, or the program code is further executable for: training a machine learning NLU model to detect utterances that are indicative of step-to-step transitions, based on manually-labeled conversation samples from remotely-guided AR sessions; and the applying of the NLU algorithm to the conversation is based on the trained machine learning NLU model.

In some embodiments, the automatic detection of the steps uses a fusion of at least two of (a), (b), and (c).

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A technique to automatically generate self-guided AR session plans from remotely-guided AR sessions is disclosed herein. The technique may be embodied in a method, a system, and a computer program product.

Advantageously, since the technique leverages existing recordings of historical remotely-guided AR sessions, there is no need to especially prepare, conduct, and record an orchestrated demonstration in order to generate a self-guided AR session plan. Rather, the technique intelligently processes data from existing remotely-guided AR session recordings in order to automatically generate the self-guided AR session plans. This is, of course, also superior to conducting self-guided AR sessions by mere playback of such recordings; the playback will likely be considerably longer than actually needed, and will typically include superfluous data.

The technique may be particularly useful when a certain technical procedure performed by a local user under guidance of a remote user, such as manipulation of one or more physical objects by the local user, involves multiple steps. Advantageously, a recording of such remotely-guided AR session may be automatically segmented into multiple segments that correspond to the steps performed. The steps may be detected, in one example, using a Natural-Language Understanding (NLU) algorithm that detects, in a conversation which took place during the remotely-guided AR session, utterances that are indicative of transitions from one step to another. In another example, the steps may be detected by analyzing locations of annotations made during the remotely-guided AR session, to detect location differences that are indicative of transitions from one step to another. In a further example, the steps may be detected by analyzing camera pose data from the remotely-guided AR session, to detect pose transitions that are indicative of transitions from one step to another.

A self-guided AR session plan may then be automatically generated based on the segmented data. The plan may include step-by-step AR guidance, to be executed by a computerized AR system worn by or otherwise used by a user, on how to perform the multiple steps. The plan may further include program instructions configured to cause the computerized AR system to transition between steps of the step-by-step AR guidance responsive to one or more user commands and/or one or more machine vision detections of step completion.

Figure 1:
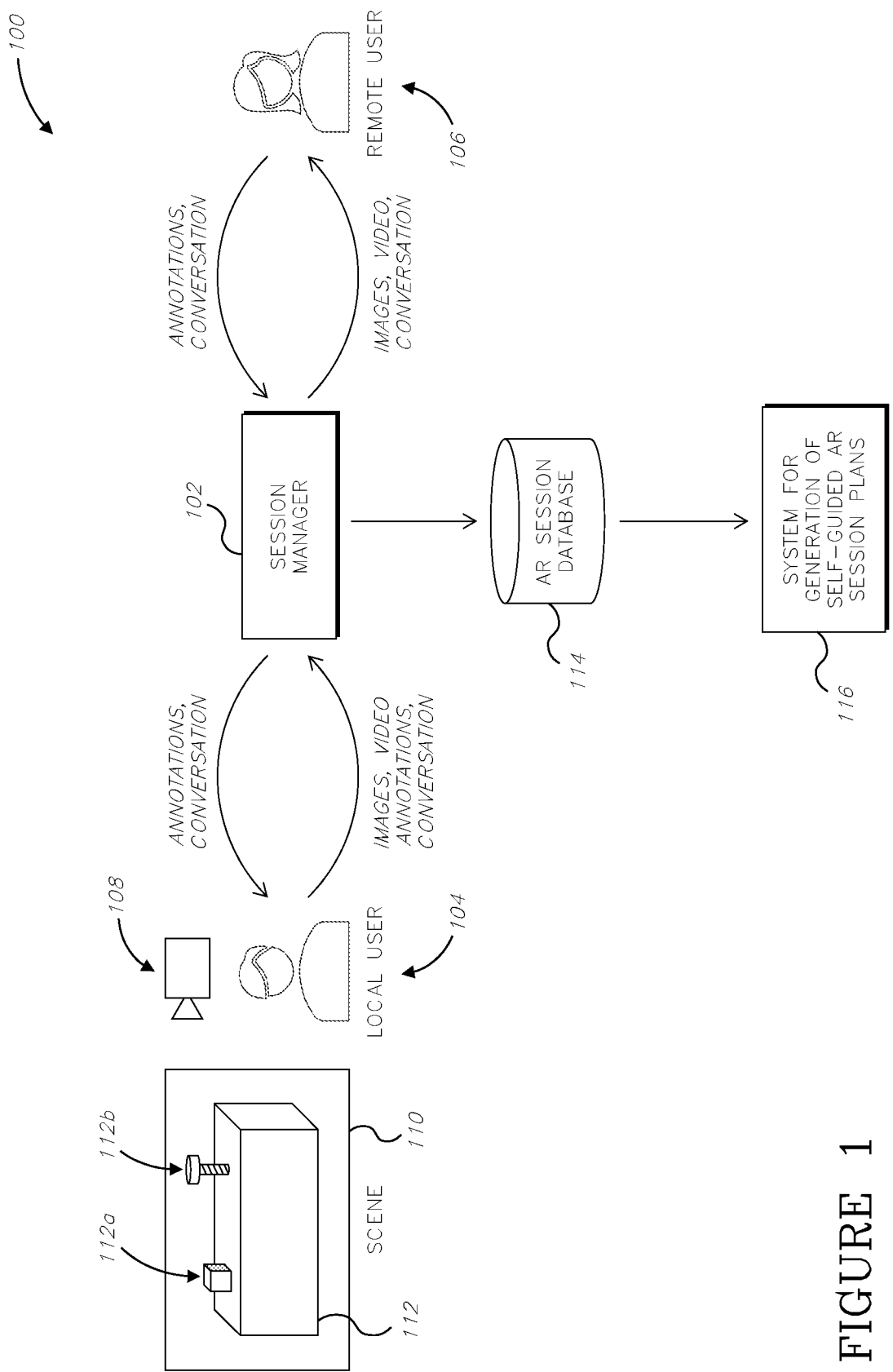
FIG. 1 is flow diagram of a process involving a remotely-guided AR session and generation of a self-guided AR session plan from that remotely-guided AR session.

Reference is now made to FIG. 1, which is a flow diagram of a process 100 involving a remotely-guided AR session and generation of a self-guided AR session plan from that remotely-guided AR session.

In process 100, AR session data are received, transmitted, and/or processed by a remotely-assisted session manager 102 during a remotely-assisted AR session. Session manager 102 denotes one or more computing devices that manage the remotely-assisted AR session between a local user 104 and a remote user 106. For example, session manager 102 may be a computing device located in the immediate vicinity of local user 104, and communicates over a network with a personal computing device (not shown) of remote user 106. As an opposite example, session manager 102 may be a computing device located in the immediate vicinity of remote user 106, and communicates over a network with a personal computing device (not shown) of local user 104. As a further example, session manager 102 may be a server-type computing device situated away from users 104 and 106, and accessible to them, via their personal computing devices, over a network. The network may be, for example, a LAN (Local Area Network) or a WAN (Wide Area Network, such as the Internet).

Session manager 102, or the personal computing device of local user 104, may include or be functionally associated with a camera 108 that captures still images and/or videos of a physical scene 110 adjacent the local user. For reasons of simplicity, the term "images" is used hereinafter to denote either still images, video frames, or both.

Scene 110 may include any indoors or outdoors area at which a procedure is performed by local user 104 with respect to one or more objects, such as object 112. By way of example, scene 110 may be an area in a factory in which a certain piece of equipment (e.g., a machine or any type of apparatus) undergoes maintenance by local user 104, or an engine compartment of a motor vehicle in which a certain automotive part is being serviced by the local user.

Object 112 may in fact include a multiplicity of smaller objects, such as distinct parts or designated regions of the larger object. In the illustrated example, these smaller objects are a rectangular button 112a and a screw 112b. For simplicity of discussion, the term "object" is used hereinafter to describe any type of object that may be located in a scene, be it a whole apparatus or a part or a region of an apparatus.

The images captured by camera 108 may be transmitted to remote user 106 for viewing, and may also be displayed to local user 104, for example on a screen of a portable computing device, a wearable display, or the like.

Session manager 102, or the personal computing device of local user 104, may further obtain or calculate, in accordance with conventional techniques, camera pose data (sometimes referred to in the art as "camera position and orientation data") that is defined relative to a set of three-dimensional (3D) coordinates of scene 110.

Session manager 102, or the personal computing device of any one of the users, may further obtain or reconstruct from the camera pose data and/or the images, in accordance with conventional techniques, a 3D point cloud of scene 110, which is defined relative to the aforementioned set of 3D coordinates of the scene.

Session manager 102, or the personal computing device of remote user 106, may further manage generation and transmission of annotations, such as text and/or graphic annotations, which the remote user creates and associates with various locations in the images he or she views. The locations of these annotations may then be translated, by session manager 102 or the personal computing device of remote user 106, relative to the set of 3D coordinates of scene 110. The annotations and their 3D coordinates may next be transmitted to the personal computing device of local user 104, and displayed to him or her as an augmented layer over the scene 110, in corresponding locations.

For example, during the remotely-assisted AR session, remote user 106 may use one or more input devices (e.g., keyboard, pointing device, touch screen, etc.) to overlay annotations on the displayed objects of scene 110. For instance, if remote user 106 wishes to instruct local user 104 to remove screw 112b from object 112, then the remote user may draw a graphic annotation at the location of the screw in one or more of the images, such as an arrow pointing at the location, a shape surrounding the location, or any other type of visual marking of the location. Although the location is typically a point, it could also be a circumscribed two-dimensional (2D) area or even a circumscribed 3D space.

Remote user 106 may accompany that graphic annotation with text describing the annotated object and/or instructing local user 104 how to manipulate it, thereby creating a combined textual-graphic annotation. However, in some cases, remote user 106 merely draws a graphic annotation at the location of the object, and provides the description or instructions only in a textual or voice conversation he or she simultaneously conducts with local user 104.

Although it is typical, in remotely-assisted AR sessions, that annotations are made by remote user 106, they may just as well be made by local user 104. For example, local user 104 may draw an arrow pointing at an object, and pose a question to remote user 106, via text, voice, or video chat, as to the nature of that object or as to how it should be manipulated.

Session manager 102 may further facilitate transmission of a conversation between local user 104 and remote user 106, such as in the form of a textual chat, a voice chat, and/or a face-to-face video chat between them, all during the remotely-guided AR session.

Session manager 102 may record, in an AR session database 114, all or some of the data obtained, used, transmitted, generated, and/or calculated during or with respect to multiple remotely-guided AR sessions, such as images, camera pose data, scene 3D coordinates, scene 3D point clouds, annotations, and conversations. If the remotely-guided AR session included a voice chat or a video chat between its participants, then a transcript of such conversation may be generated by a speech-to-text engine, and stored in AR session database 114 in lieu of or in addition to the actual voice or video file. For simplicity of discussion, the term "conversation" is used to describe either the text of a conversation which was conducted originally in text, or the transcript of a voice or video conversation, or both.

The stored data, or some thereof, may be time-stamped, to later enable temporal correlation between different modalities of the data. For example, the transcript may be stored in conjunction with metadata in the form of a time stamp per each message, utterance, sentence, or the like, denoting when that message/utterance/sentence was transmitted during the conversation. Similarly, for example, a time stamp may be stored as metadata with each of the annotations and each of the images, denoting when they were made or captured, respectively.

A system for generating self-guided AR session plans 116 from the recorded remotely-guided AR sessions may be provided. System 116 may receive data from AR session database 114 and automatically generate such self-guided AR session plans, each suitable for execution in scenes similar to the scene in which the respective remotely-guided AR session was recorded, or even in the same scene.

In some embodiments, system 116 generates each self-guided AR session plan based solely on data recorded during one or more remotely-guided AR sessions, and not based on any other user input.

Figure 2:
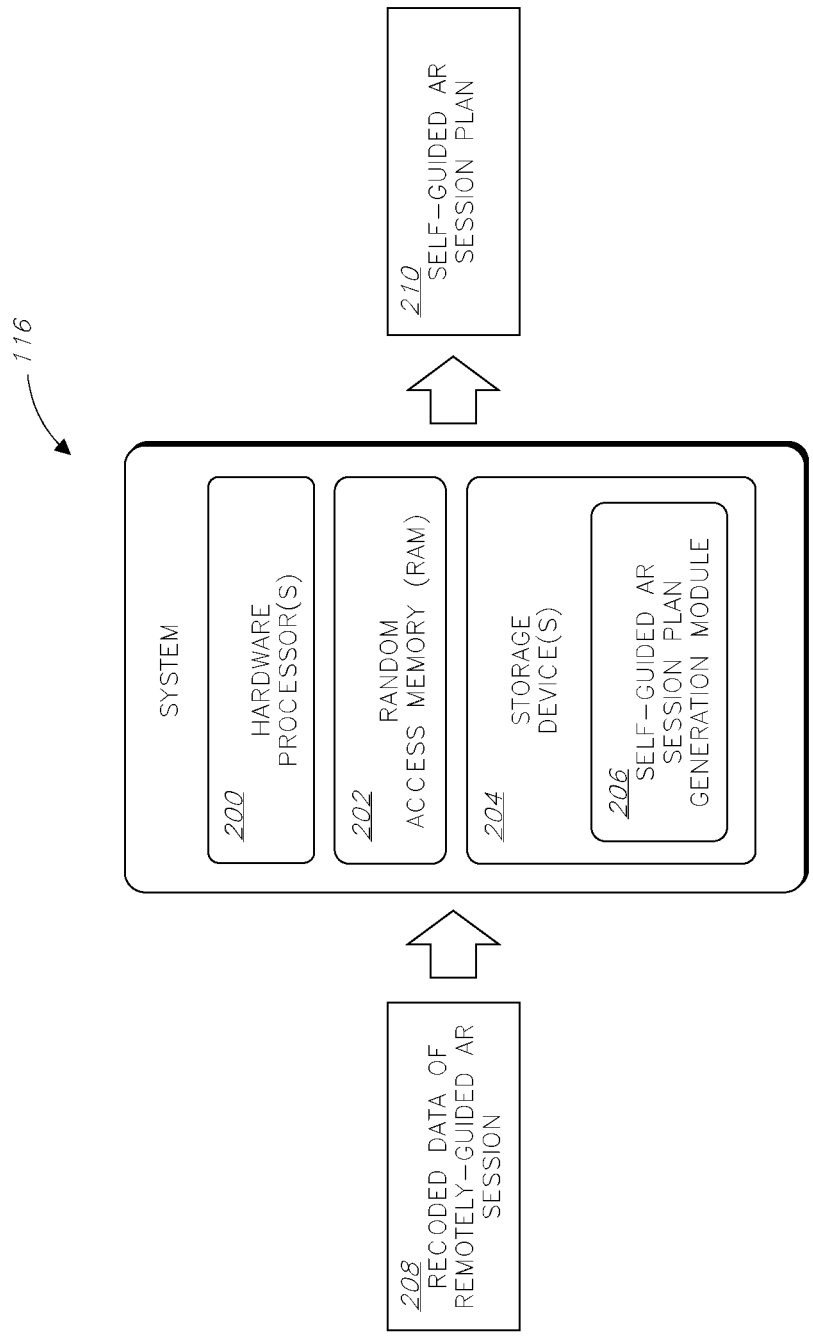
FIG. 2 is a block diagram of a system for generating self-guided AR session plans.

Reference is now made to FIG. 2, which shows a detailed block diagram of system 116, according to an embodiment. System 116 may include one or more hardware processor(s) (e.g., CPUs) 200, a random-access memory (RAM) 202, and one or more non-transitory computer-readable storage device(s) 204.

Storage device(s) 204 may have stored thereon program instructions and/or components configured to operate hardware processor(s) 200. The program instructions may include one or more software modules, such as a self-guided AR session plan generation module 206. The software components may include an operating system having various software components and/or drivers for controlling and managing general system tasks (e.g., memory management, storage device control, power management, networking, etc.), and facilitating communication between various hardware and software components.

System 116 may operate by loading instructions of self-guided AR session plan generation module 206 into RAM 202 as they are being executed by processor(s) 200. The instructions of self-guided AR session plan generation module 206 may cause system 116 to receive recorded data of a remotely-guided AR session, process it, and output a self-guided AR session plan 210 that is configured to be executed by a computerized AR system (not shown) worn by or otherwise used by a user.

System 116 as described herein is only an exemplary embodiment of the present invention, and in practice may be implemented in hardware only, software only, or a combination of both hardware and software. System 116 may have more or fewer components and modules than shown, may combine two or more of the components, or may have a different configuration or arrangement of the components. System 116 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 116 may be co-located or distributed, or the system could run as one or more cloud computing "instances," "containers," and/or "virtual machines," as known in the art.

The instructions of self-guided AR session plan generation module 206 are now discussed with reference to the flowchart of FIG. 3, which illustrates a method 300 for generating a self-guided AR session plan, in accordance with present embodiments.

Steps of method 300 may either be performed in the order they are presented or in a different order (or even in parallel), as long as the order allows for a necessary input to a certain step to be obtained from an output of an earlier step. In addition, the steps of method 300 are performed automatically (e.g., by system 116 of FIGS. 1 and 2), unless specifically stated otherwise.

In step 302, data recorded during a remotely-guided AR session may be received. The session was held between at least one a remote user and at least one local user. Merely to simplify the following discussions, a single remote user and a single local user are referred to hereinafter.

The received data may include, for example, images of a scene, captured by a camera of the local user; pose data of the camera; annotations made by at least one of the remote and local users; a conversation between the remote and local users; and/or any other data stored in AR session database 114 (of FIG. 1), such as scene 3D coordinates, scene 3D point clouds, etc.

In step 304, a 3D representation of the scene may be generated based on the images and the camera pose data, using conventional techniques. This 3D representation may be useful, in certain embodiments, when the 3D point cloud generated during a remotely-guided AR session is a rough, inaccurate representation of the scene, which is only sufficient for simple tasks such as overlaying annotations in approximately the right locations. A 3D representation which is generated offline, without the real-time constraint of an ongoing AR session, may be much more accurate and therefore can be used to generate a robust self-guided AR session plan. However, in cases where the 3D point cloud that was generated during the remotely-guided AR session is sufficiently accurate, a 3D representation of the scene may be generated from that point cloud instead of from the images and the camera pose data.

Optionally, the generated 3D representation of the scene is or includes at least one 3D model of at least one physical object, respectively. For example, if the remotely-guided AR session is directed towards maintenance of a desktop printer, then step 304 may include generation of a 3D model of that printer. This way, the later-generated self-guided AR session plan (discussed below) may be agnostic to the surroundings of a same-model desktop printer that is to be maintained, such as a cabinet or a shelf on which the printer is located, furniture surrounding the printer, etc.

In step 306, the annotations may be associated with suitable locations in the generated 3D representation. This association be performed, for example, by correlating the original locations of the annotations, as defined during the remotely-guided AR session in the set of 3D coordinates of the scene, with the generated 3D representation and its own coordinate set.

Optionally, this step may also include a comparison of the annotations and their locations with a 'digital twin' of the pertinent object of the scene, if such digital twin is available. A digital twin, as known in the art, is a computer-simulated 3D model of an object, typically including textual labels that name and/or describe various parts of that object. A digital twin is often generated to be used as a reference to technicians or other people interested in learning about the intricacies of an object. Because a digital twin typically includes expertly-defined labels, these labels may be used in step 306 to enrich, correct, and/or add to the annotations made in the remotely-guided AR session. For example, if a certain annotation reads "button" but the corresponding label in the digital twin (namely, a label located in substantially the same location of the object as the annotation) is "main power button," the latter may be preferred. Following the comparison between the two, a final text for each annotation may be selected based on one or more criteria such as the longest text, the shortest text, a concatenation of both texts, or a simple selection of just the label's text to override the annotation's text.

Optionally, the finally-selected text may also be utilized to replace text existing in the conversation, which is identical or similar to text of the pertinent annotation. For example, if the annotation "button" in a certain segment has been overridden by the digital twin label "main power button," all occurrences of the text "button" in the conversation, in the same segment, may also be replaced by "main power button."

In step 308, at least some of the received data (such as one or more modalities thereof, or a portion of the data available for each of one or more modalities) may be segmented into multiple temporal segments that correspond to multiple steps performed by the local user in the scene during the remotely-guided AR session. As a simplistic example, if the local user pushed button 112a, removed screw 112b, cleaned the screw's bore, and threaded the screw back into the bore (namely, made four object manipulations), then the data may be segmented into four temporal segments—one per each of these four steps.

Step 308 may be better understood with reference to FIG. 4, which is a semi-pictorial illustration of an exemplary personal computing device 400 (in this example, a smart phone) of the remote user or the local user, during a remotely-assisted AR session. Specialized software running on device 400 may facilitate the session, by interfacing with one or more cameras of the device, with its network (e.g., Internet) connection functionalities (e.g., to conduct text, voice, and/or video chats), and by providing a graphical user interface (GUI) with functionalities required for the session.

One region on the display of device 400 may display images or a video 402 captured by the camera of the local user. Another region may display a conversation 404 between the remote user and the local user, taking place as a text chat in this illustrative example.

The displayed conversation 404 includes messages spanning a period of time between 9:59:30 and 10:02:08 (hours:minutes:seconds). The local user, John, asks the remote user, Jane, how to replace a rusty screw. Jane guides John through the steps necessary to replace the screw, of which the first two are illustrated: turning off power to the unit, and threading out the rusty screw. The remote guidance provided by Jane includes, in this example, both textual instructions and graphical annotations which she positions next to where the 'off' button and the screw are displayed on her screen. The steps performed by John include manipulation of three physical objects present in the scene, namely—the 'off' button that is pressed, the unit that is turned off (by the button press), and the screw that is threaded out. However, the relation between steps and object manipulations is not necessarily one manipulation per step; it is quite possible, in certain embodiments, for a step to include multiple manipulations, either of the same object or of different objects.

In the exemplary scenario of FIG. 4, it may be beneficial to segment the recorded data into two: a first segment from 9:59:30 to 10:01:21, corresponding to the first step (turning off the unit), and a second segment from 10:01:44 to 10:02:08, corresponding to the second step (threading out the screw). Of course, it is also possible for the segments to be partially overlapping if so desired, so that each new segment also includes a brief portion of the preceding segment, serving as a reminder to the self-guided user. It is also possible, when segmenting the recorded data, to omit data portions (out of one or more modalities) which are deemed unnecessary for a self-guided session, such as niceties exchanged between the users of the remotely-guided session, or, in a more general sense, anything which is not a direct instruction to perform a certain action in the scene.

Figure 3:
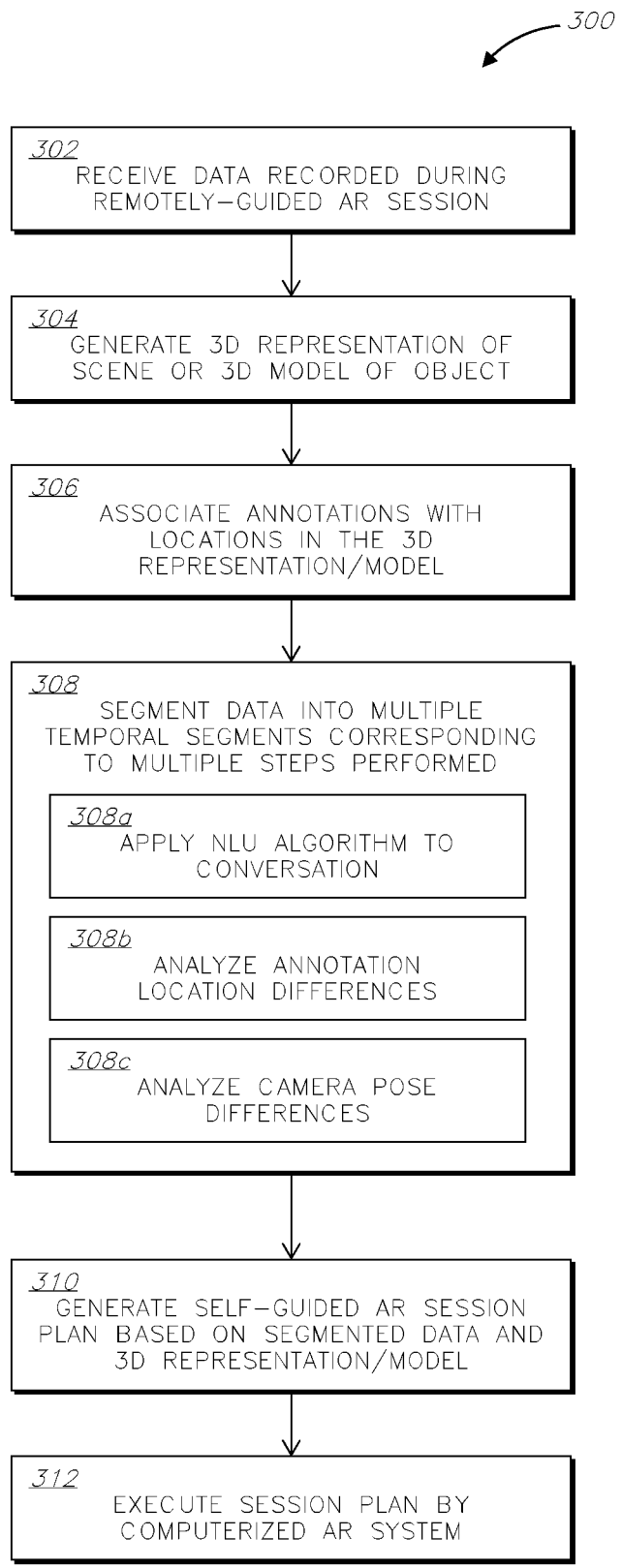
FIG. 3 is a flowchart of a method for generating a self-guided AR session plan.

Reference is now made back to the flowchart of FIG. 3. To detect the steps existing in the data as such, one or more of the following sub-steps may be carried out:

In sub-step 308a, a machine learning Natural-Language Understanding (NLU) algorithm may be applied to the conversation, to detect utterances, made by the local user and/or the remote user, that are indicative of step-to-step transitions. For example, with interim reference to FIG. 4, the local user may utter (vocally or by typing text) a phrase such as "I pressed it", in which the past tense of the verb "press" indicates the completion of a step, or a phrase like "What next?", which is one of many typical phrases people tend to use to indicate they have completed a step. The remote user, in turn, may utter phrases or words like "First, . . . " or "Now . . . ", which are words people typically use when beginning to describe a new step.

The NLU algorithm may utilize a machine learning NLU model that has been previously trained, on the basis of manually-labeled conversation samples from remotely-guided AR sessions, to detect such utterances. The samples may be labeled by human reviewers instructed to label (namely, mark) those words or phrases in the samples which they believe indicate a transition from one step to another, such as completion of a step and/or the beginning of a new step. Training the model based on these labeled samples may be performed using conventional techniques.

In some embodiments, the NLU algorithm is an intent classification algorithm (sometimes referred to as an "intent analysis" or "intent detection" algorithm), which is configured to analyze the conversation and detect words, phrases, and/or sentences that express an underlying intent to proceed to the next step and/or to report completion of the current step.

As an alternative or in addition to the use of an NLU algorithm, step-to-step transitions may be detected by searching for words and/or phrases from the conversation in a custom dictionary which includes words and/or phrases that have been predetermined to indicate such transitions. The search may be expanded to also cover synonyms and/or grammatical inflections of such words and/or phrases.

In sub-step 308b, the locations (in the 3D representation of the scene) associated with the annotations may be analyzed, to detect location differences that are indicative of step-to-step transitions. For example, with interim reference to FIG. 4, the fact that the "Press" and "Thread Out" annotations are associated with different locations in the 3D representation of the scene may be indicative of them belonging to two different steps. Namely, subsequent annotations made at vastly distant locations in the scene may indicate that the focus of the participating users has shifted from one object onto another, and probably from one step onto another step.

Accordingly, in sub-step 308b, one segment may be defined as the time period from (and including) the making of the "Press" annotation to the making (but exclusive) of the "Thread Out" annotation, and a subsequent segment may be defined as the time period from (and including) the making of the "Thread Out" annotation to the making (but exclusive) of the next annotation (not demonstrated in FIG. 4). However, as generally discussed above regarding step 308, the segments may partially overlap if so desired.

The detection of annotation location differences may be based on a predefined threshold, so that locations which are very close (below the threshold) will not trigger a step transition detection, and vice versa. The threshold may be defined, for example, in units of physical distance in the actual scene (e.g., X inches). However, since the overall size of the scene or of the manipulated object(s) may greatly vary between remotely-guided AR sessions, the threshold may be defined relative to a mean, a median, a mode, or a different statistical measure of distances between subsequent annotations made in the session. For example, in a scene involving manipulations made to an automobile, the mean distance between pairs of subsequent annotations may be 2 feet, while in a scene involving manipulations made to a desktop printer, that mean distance may be 2 inches. Accordingly, a suitable threshold may, for example, 50-70% of the mean distance. More broadly defined, a threshold may be set at 20-90% of the mean, median, mode, or different statistical measure of the distances between subsequent annotations. In further embodiments, the threshold may be set at a value exceeding the aforementioned 20-90% range.

In addition or as an alternative to a distance threshold, a temporal threshold may be set, so that annotation made very shortly one after another (below the temporal threshold) will not trigger a step transition detection, and vice versa. Similar to the distance threshold, the temporal threshold may also be set rigidly in units of seconds, or flexibly as a percentage of a statistical measure (e.g., mean, median, mode) of temporal differences between all subsequent pairs of annotations.

In sub-step 308c, the camera pose data may be analyzed, to detect pose transitions that are indicative of step-to-step transitions. Similar to the analysis of the annotation locations in the previous sub-step 308b, the camera pose data is yet another source enabling an understanding of a shifting focus of the users during the remotely-guided AR session. When the camera of the local user remains in approximately the same pose for a while, and then makes a substantial pose change which is maintained for another while, this may indicate that two different steps have been carried out by the local user.

Figure 4B:
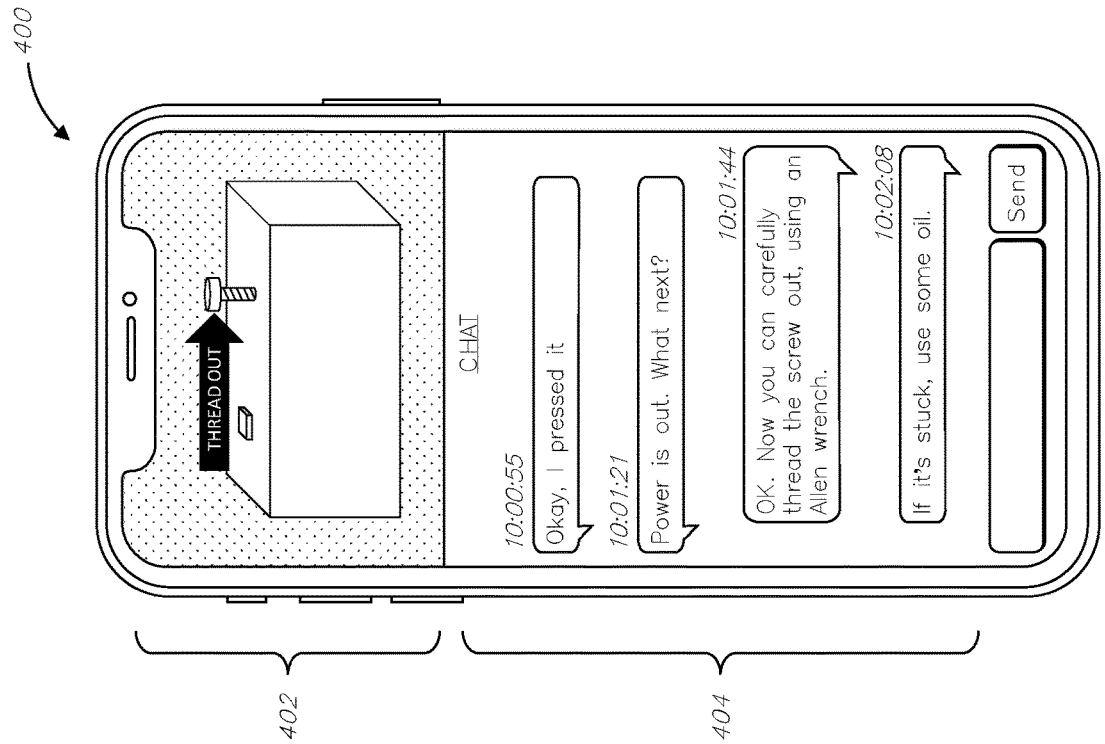
FIGS. 4A and 4B are semi-pictorial illustrations of an exemplary personal computing device during a remotely-guided AR session.
Figure 4A:
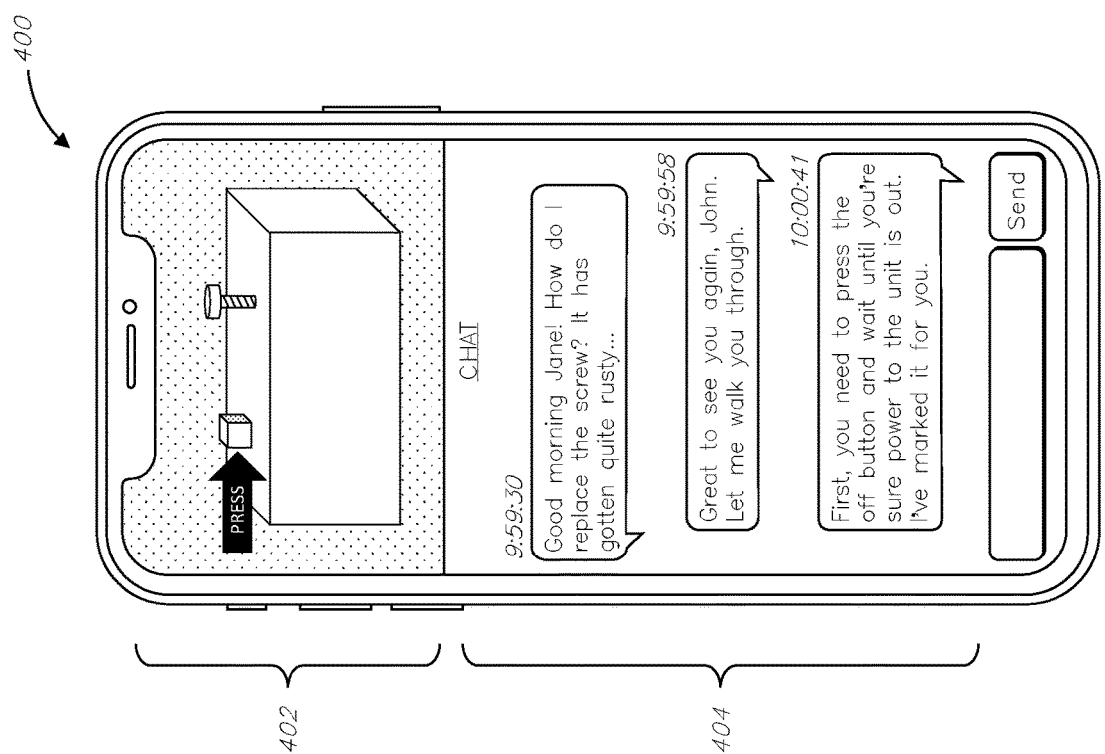
Figure 5B:
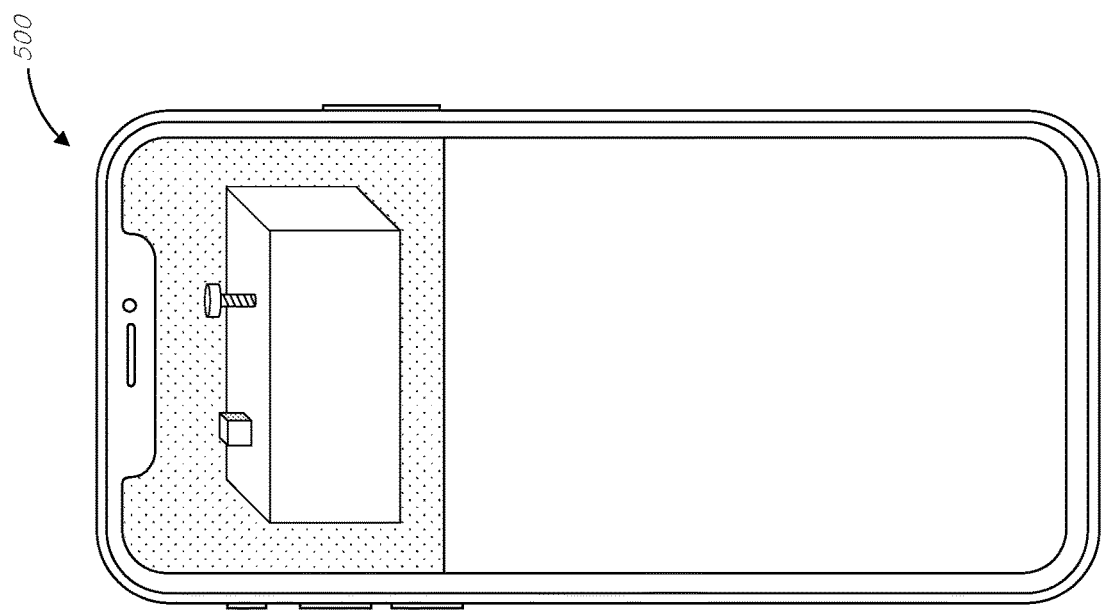
FIGS. 5A and 5B are additional semi-pictorial illustrations of the exemplary personal computing device during the remotely-guided AR session.
Figure 5A:
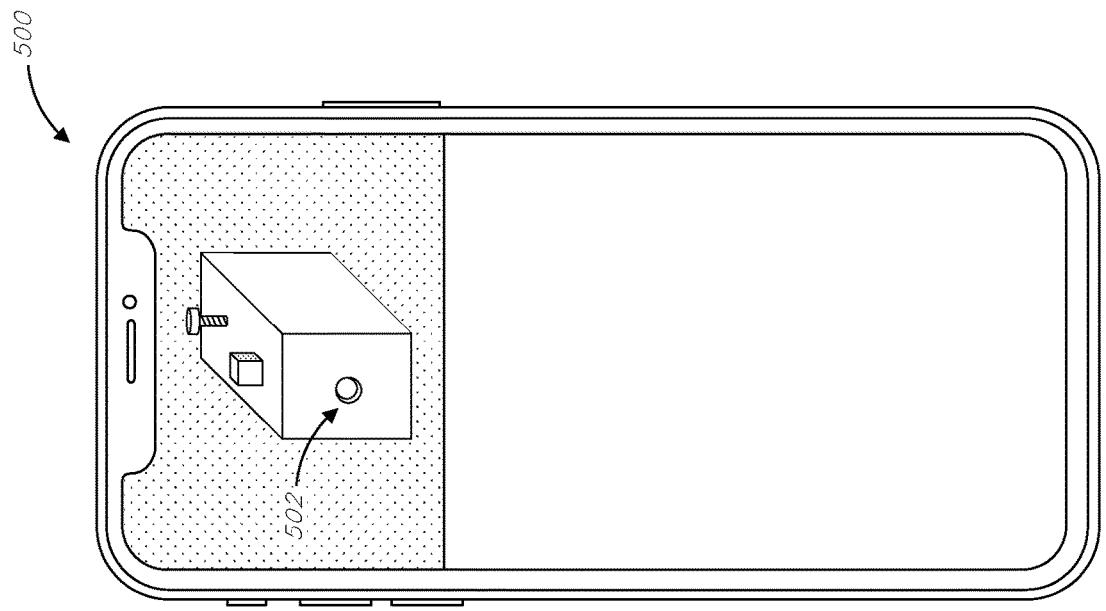

With interim reference to FIGS. 5A and 5B, which show the same object as in FIGS. 4A and 4B on a smartphone 500 display, if the camera pose changes from viewing the front of the object (FIG. 5A) to viewing the side of the object (FIG. 5B), this is likely indicative of the first pose associated with a first step, and the second pose associated with a second step. It may be, for example, that the second pose allows the local user to view (and possibly manipulate) a bore 502 in the left facet of the object, which was not visible in the first pose.

The detection of such pose transitions may be based on a threshold of location and/or orientation differences of the camera, and optionally also on a temporal threshold that filters out poses which are not maintained for long (e.g., camera pose shifts that are more likely attributed to accidental moves or otherwise insignificant moves than to moves that indicate a real shift in focus by the local user). These thresholds, as before, may either be rigidly defined in units of distance/angle (corresponding to location/orientation in the pose data) and time, respectively, or flexibly as a percentage of a certain statistical measure of pose changes.

Optionally, the detection of steps according to step 308 may include a fusion of two or all three of sub-steps 308a, 308b, and 308c. The fusion may include, for example, adding one or more steps which were detected by one or more techniques out of the three (NLU, annotation location analysis, camera pose analysis) but not by one or more different techniques out of the three. For example, if detection by the NLU algorithm produced two segments with a long temporal gap in between, and detection by the camera pose analysis produced a segment exactly at that long gap (or even slightly overlapping with the neighboring segments), then all three segments may be utilized. Another option is to undergo an automated voting process, in which the segmentation is determined by a majority vote out of the three different techniques, or by a random technique if the votes are equal for any certain segment.

In step 310, a self-guided AR session plan (hereinafter "session plan") may be generated based on the segmented data and the 3D representation. The session plan may include step-by-step AR guidance on how to perform the multiple steps in the scene where the remotely-guided AR session took place, or in a similar scene (e.g., a scene including the same or a similar object(s) that requires the same or similar manipulations).

The session plan may include a set of program instructions configured to be executed 312 by a computerized, self-guided AR system. The self-guided AR system, in some embodiments, is fully or partially wearable or carriable by its user. This system may include at least a camera, a display, and a computerized device, which cooperate to analyze the scene imaged by the camera, track the pertinent object(s) in it, and, in real time, overlay information as an augmented layer on the displayed scene, and/or otherwise provide the user with such information.

The information provided by the self-guided AR system is, in present embodiments, the guidance included in the session plan. That guidance, in each of the steps, may include instructions on how to manipulate one or more physical objects present in the pertinent scene. These instructions may include, for example, at least some of the annotations and/or at least some of the text of the conversation that took place during that remotely-guided AR session. Additionally or alternatively, the instructions may not include texts from the annotations and/or the conversation verbatim, but rather an automatically-processed version thereof, such as a summary generated by a text summarization algorithm, or the like.

For example, with interim reference to FIGS. 4A and 4B, the first step of a session plan generated based on the illustrated conversation and annotations may be the following text: "Press the main power button, indicated by an arrow. Wait until power to the unit is out." Such text may be the result of applying a text summarization algorithm to the conversation in the segment corresponding to the first step, as well as the use of a digital twin to override the word "press" with the more descriptive "main power button." Simultaneously with providing that text to the user, an arrow may be presented as an augmented layer over the scene displayed to the user, pointing at the location of the main power button. Similarly, any other suitable graphic annotation may be presented at or near the location of the main power button. Optionally, the text of the guidance itself may be presented as an augmented layer, for example at or near the location of the main power button, or farther away from the button (so as not to obstruct it from view) but with an arrow, a line, or a different graphic connector visualizing the attribution of the textual guidance to the location of the button. Alternatively, the text of the guidance may be displayed in a different area of a computerized display used by the user, not as an augmented layer over the scene. In a further option, the guidance, or certain portions thereof, may be converted to audio using a text-to-speech algorithm, and output to the user using one or more speakers, headphones, etc.

In order for the self-guided AR system to be able to track the pertinent object(s) in the scene, which is detrimental to the correct overlay of annotations, instructions, etc., the session plan may also include the generated 3D representation of the scene, and/or the generated 3D model(s) of the object(s), encoded in a format readable by the self-guided AR system.

Advantageously, the step-by-step fashion of the session plan may cause the self-guided AR system to begin presentation of guidance associated with each step responsive to a user command and/or a machine vision detection of completion of an immediately-preceding step.

In one option, the program instructions of the session plan may be configured to make the self-guided AR system transition between steps of the guidance in response to the user uttering, typing, or otherwise issuing a command to proceed to the next step. For instance, the program instructions may be configured with a list of words and/or phrases such as "let's proceed," "next," "please continue," or "go on," which, when uttered by the user and captured by a microphone of the computerized AR system, cause it to proceed to the next step of the guidance. Additionally or alternatively, the NLU model that was trained in sub-step 308a to detect utterances indicative of a step-to-step transition may be used also here, to detect utterances which indicate the user's desire to have the self-guided AR system proceed to the next step of the guidance.

In a further option, the program instructions of the session plan may display a button labeled with, e.g., "Next step," "Continue," or the like, which the user may actuate in order to proceed to the next step of the AR guidance. The button may be displayed, for example, on a touch-sensitive display of the user's computerized device, and/or or overlaid on the displayed scene as an augmented layer.

In yet another option, the program instructions of the session plan may be configured with a machine vision algorithm which analyzes the imaged scene in real time, to detect a physical change in the scene which means that a step has been completed. With interim reference to FIGS. 4A and 4B, the machine vision algorithm may detect that the button, which was protruding from the top surface in FIG. 4A, is subsequently depressed and barely protruding in FIG. 4B. The program instructions may be configured to associate this specific visual detection with the completion of the step involving pressing that button, and may then automatically cause the computerized AR system to proceed to the following step of the AR guidance.

The machine vision algorithm may be trained on the basis of visual changes to object(s) depicted in the various segments of the recorded data. The training, in some embodiments, may be fully automatic: a training set may be automatically generated from images captured during the remotely-guided AR session, which are automatically labeled as being associated with a step completion or not. For example, with interim reference to FIGS. 4A and 4B, images captured between 9:59:30 and 10:00:41 may be automatically labeled as not associated with completion of the first step, because they were captured before the local user had a chance to perform the manipulation of the first step—to press the button. In contrast, images captured after 10:00:55, for example until 10:01:44 (which is when the user may have started performing the second step), may be automatically labeled as associated with completion of the first step, because they were captured after the local user reported the completion of the first step—the pressing of the button. Then, training may take place automatically, using conventional techniques, based on the labeled images.

Optionally, a training session is performed per step, to produce a step-specific machine vision model configured to detect the specific manipulation expected to happen in that step. Accordingly, when the session plan is executed, the machine vision algorithm may utilize the pre-produced machine vision model associated with the step currently taking place, in order to analyze the acquired images and detect in them, in real time, the modeled manipulation.

Optionally, even if the machine vision algorithm is used to detect step completion, the program instructions may still cause the self-guided AR system to seek explicit user confirmation before proceeding to the next step. For example, upon the machine vision algorithm detecting that the main power button has been pressed, the self-guided AR system may display a confirmation button and/or audibly ask the user whether to proceed, and await actuation of the button and/or a verbal command by the user, respectively, before proceeding.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising operating at least one hardware processor to:
receive data recorded during a remotely-guided augmented reality (AR) session held between a remote user and a local user, the recorded data comprising:
images of a scene, captured by a camera of the local user,
pose data of the camera,
annotations made by at least one of the remote and local users, and
a conversation between the remote and local users;
automatically generate a three-dimensional (3D) representation of the scene based on the images and the camera pose data, and automatically associate the annotations with locations in the 3D representation;
automatically segment at least some of the data into multiple temporal segments that correspond to multiple steps performed by the local user in the scene during the remotely-guided AR session, wherein the multiple steps are automatically detected using at least one of:
(a) applying a Natural-Language Understanding (NLU) algorithm to the conversation, to detect utterances that are indicative of step-to-step transitions,
(b) analyzing the locations associated with the annotations, to detect location differences that are indicative of step-to-step transitions, and
(c) analyzing the camera pose data, to detect pose transitions that are indicative of step-to-step transitions; and
automatically generate a self-guided AR session plan based on the segmented data and the 3D representation, wherein the AR session plan comprises step-by-step AR guidance on how to perform the multiple steps in the scene or in a similar scene.

2. The method of claim 1, wherein:
the self-guided AR session plan is configured to be executed by a computerized AR system; and
the self-guided AR session plan comprises program instructions configured to cause the computerized AR system to transition between steps of the step-by-step AR guidance responsive to at least one of:
a user command, and
machine vision detection of step completion.

3. The method of claim 1, wherein the step-by-step AR guidance comprises at least some of the annotations, localized according to their associated locations in the 3D representation.

4. The method of claim 1, wherein the step-by-step AR guidance comprises at least some of the conversation, provided as at least one of: audio, and text.

5. The method of claim 1, wherein:
the multiple steps performed by the local user in the scene comprise manipulation of at least one physical object;
the generation of the 3D representation of the scene comprises generation of at least one 3D model of the at least one physical object, respectively; and
the step-by-step AR guidance comprises guidance on how to manipulate the at least one physical object in the scene, or at least one similar physical object in the similar scene, respectively.

6. The method of claim 1, wherein:
the method further comprises training a machine learning NLU model to detect utterances that are indicative of step-to-step transitions, based on manually-labeled conversation samples from remotely-guided AR sessions; and
the applying of the NLU algorithm to the conversation is based on the trained machine learning NLU model.

7. The method of claim 1, wherein the automatic detection of the steps uses a fusion of at least two of (a), (b), and (c).

8. A system comprising:
(i) at least one hardware processor; and
(ii) a non-transitory computer-readable storage medium having program code embodied therewith, the program code executable by said at least one hardware processor to:
receive data recorded during a remotely-guided augmented reality (AR) session held between a remote user and a local user, the recorded data comprising:

images of a scene, captured by a camera of the local user, pose data of the camera, annotations made by at least one of the remote and local users, and a conversation between the remote and local users, automatically generate a three-dimensional (3D) representation of the scene based on the images and the camera pose data, and automatically associate the annotations with locations in the 3D representation, automatically segment at least some of the data into multiple temporal segments that correspond to multiple steps performed by the local user in the scene during the remotely-guided AR session, wherein the multiple steps are automatically detected using at least one of:

(a) applying a Natural-Language Understanding (NLU) algorithm to the conversation, to detect utterances that are indicative of step-to-step transitions, (b) analyzing the locations associated with the annotations, to detect location differences that are indicative of step-to-step transitions, and (c) analyzing the camera pose data, to detect pose transitions that are indicative of step-to-step transitions, and automatically generate a self-guided AR session plan based on the segmented data and the 3D representation, wherein the AR session plan comprises step-by-step AR guidance on how to perform the multiple steps in the scene or in a similar scene.

9. The system of claim 8, wherein:

the self-guided AR session plan is configured to be executed by a computerized AR system; and the self-guided AR session plan comprises program instructions configured to cause the computerized AR system to transition between steps of the step-by-step AR guidance responsive to at least one of:

a user command, and machine vision detection of step completion.

10. The system of claim 8, wherein the step-by-step AR guidance comprises at least some of the annotations, localized according to their associated locations in the 3D representation.

11. The system of claim 8, wherein the step-by-step AR guidance comprises at least some of the conversation, provided as at least one of: audio, and text.

12. The system of claim 8, wherein:

the multiple steps performed by the local user in the scene comprise manipulation of at least one physical object;

the generation of the 3D representation of the scene comprises generation of at least one 3D model of the at least one physical object, respectively; and the step-by-step AR guidance comprises guidance on how to manipulate the at least one physical object in the scene, or at least one similar physical object in the similar scene, respectively.

13. The system of claim 8, wherein:

the program code is further executable by said at least one hardware processor to train a machine learning NLU model to detect utterances that are indicative of step-to-step transitions, based on manually-labeled conversation samples from remotely-guided AR sessions; and the applying of the NLU algorithm to the conversation is based on the trained machine learning NLU model.

14. The system of claim 8, wherein the automatic detection of the steps uses a fusion of at least two of (a), (b), and (c).

15. A computer program product comprising a non-transitory computer-readable storage medium having program code embodied therewith, the program code executable by at least one hardware processor to:

receive data recorded during a remotely-guided augmented reality (AR) session held between a remote user and a local user, the recorded data comprising:

images of a scene, captured by a camera of the local user, pose data of the camera, annotations made by at least one of the remote and local users, and a conversation between the remote and local users;

automatically generate a three-dimensional (3D) representation of the scene based on the images and the camera pose data, and automatically associate the annotations with locations in the 3D representation;

automatically segment at least some of the data into multiple temporal segments that correspond to multiple steps performed by the local user in the scene during the remotely-guided AR session, wherein the multiple steps are automatically detected using at least one of:

(a) applying a Natural-Language Understanding (NLU) algorithm to the conversation, to detect utterances that are indicative of step-to-step transitions, (b) analyzing the locations associated with the annotations, to detect location differences that are indicative of step-to-step transitions, and (c) analyzing the camera pose data, to detect pose transitions that are indicative of step-to-step transitions; and automatically generate a self-guided AR session plan based on the segmented data and the 3D representation, wherein the AR session plan comprises step-by-step AR guidance on how to perform the multiple steps in the scene or in a similar scene.

16. The computer program product of claim 15, wherein:

the self-guided AR session plan is configured to be executed by a computerized AR system; and the self-guided AR session plan comprises program instructions configured to cause the computerized AR system to transition between steps of the step-by-step AR guidance responsive to at least one of:

a user command, and machine vision detection of step completion.

17. The computer program product of claim 15, wherein the step-by-step AR guidance comprises at least some of the annotations, localized according to their associated locations in the 3D representation.

18. The computer program product of claim 15, wherein the step-by-step AR guidance comprises at least some of the conversation, provided as at least one of: audio, and text.

19. The computer program product of claim 15, wherein:

the multiple steps performed by the local user in the scene comprise manipulation of at least one physical object;

the generation of the 3D representation of the scene comprises generation of at least one 3D model of the at least one physical object, respectively; and the step-by-step AR guidance comprises guidance on how to manipulate the at least one physical object in the scene, or at least one similar physical object in the similar scene, respectively.

20. The computer program product of claim 15, wherein:
the program code is further executable by the at least one hardware processor to train a machine learning NLU model to detect utterances that are indicative of step-to-step transitions, based on manually-labeled conversation samples from remotely-guided AR sessions; and
the applying of the NLU algorithm to the conversation is based on the trained machine learning NLU model.

* * * * *